United States Patent
Schweikart et al.

(10) Patent No.: US 10,132,278 B2
(45) Date of Patent: *Nov. 20, 2018

(54) FILTER ELEMENT AND FILTER SYSTEM HAVING A FILTER ELEMENT

(71) Applicant: Mann+Hummel GMBH, Ludwigsburg (DE)

(72) Inventors: Marco Schweikart, Marbach (DE); Martin Weindorf, Kornwestheim (DE); Ulrich Abel, Kornwestheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,269

(22) Filed: Nov. 27, 2015

(65) Prior Publication Data
US 2016/0076496 A1    Mar. 17, 2016

Related U.S. Application Data

(63) Continuation of application No. PCT/EP2014/061100, filed on May 28, 2014.

(30) Foreign Application Priority Data

May 28, 2013  (DE) ........................ 10 2013 008 987
Dec. 12, 2013  (DE) ........................ 10 2013 020 539

(51) Int. Cl.
*F02M 37/22*  (2006.01)
*B01D 35/153*  (2006.01)
(Continued)

(52) U.S. Cl.
CPC ............. *F02M 37/22* (2013.01); *B01D 29/15* (2013.01); *B01D 29/21* (2013.01); *B01D 35/005* (2013.01);
(Continued)

(58) Field of Classification Search
CPC ........ B01D 29/15; B01D 29/21; B01D 35/00; B01D 35/005; B01D 35/153;
(Continued)

(56) References Cited

U.S. PATENT DOCUMENTS

| | | | | |
|---|---|---|---|---|
| 4,437,986 A | * | 3/1984 | Hutchins | ................ B01D 17/00 210/130 |
| 4,477,345 A | * | 10/1984 | Szlaga, Jr. | ......... B01D 17/0214 210/130 |
| 5,084,170 A | * | 1/1992 | Janik | ...................... B01D 17/00 210/232 |
| 7,572,306 B2 | | 8/2009 | Hawkins et al. | |

(Continued)

FOREIGN PATENT DOCUMENTS

DE      4344588 A1   6/1995
DE      19519352 A1  11/1996
(Continued)

*Primary Examiner* — Robert Clemente
*Assistant Examiner* — Akash K Varma
(74) *Attorney, Agent, or Firm* — James Hasselbeck (57) ABSTRACT

The invention relates to a filter element (10) having a first fluid path (12) for filtering a first fluid and a second fluid path (14) having a fluid line (16) for carrying a second fluid, wherein a non-return valve (18) is arranged in the second fluid path (14), said non-return valve (18) closing the second fluid path (14) if a flow of the first liquid through the filter element (10) is interrupted. The invention further relates to a filter system (100) including such a filter element (10).

14 Claims, 9 Drawing Sheets

(51) Int. Cl.
*B01D 35/00* (2006.01)
*B01D 36/00* (2006.01)
*B01D 29/21* (2006.01)
*B01D 29/15* (2006.01)

(52) U.S. Cl.
CPC ......... *B01D 35/153* (2013.01); *B01D 36/001*
(2013.01); *F02M 37/221* (2013.01); *B01D 2201/0415* (2013.01); *B01D 2201/295* (2013.01); *B01D 2201/305* (2013.01); *B01D 2201/316* (2013.01)

(58) Field of Classification Search
CPC .......... B01D 36/001; B01D 2201/0415; B01D 2201/295; B01D 2201/305; B01D 2201/316; F02M 37/221; F02M 37/22
USPC ........................................................ 210/136
See application file for complete search history.

(56) References Cited

U.S. PATENT DOCUMENTS

| | | | |
|---|---|---|---|
| 2005/0023209 A1 | 2/2005 | Clausen et al. | |
| 2008/0272046 A1* | 11/2008 | Lampert | B01D 29/21 210/312 |
| 2009/0230063 A1 | 9/2009 | Hawkins et al. | |
| 2010/0314303 A1* | 12/2010 | Reyinger | B01D 29/21 210/130 |
| 2011/0036770 A1* | 2/2011 | Jokschas | B01D 29/21 210/440 |
| 2012/0187038 A1 | 7/2012 | Schick | |

FOREIGN PATENT DOCUMENTS

| | | |
|---|---|---|
| DE | 19716085 A1 | 10/1998 |
| DE | 20101574 U1 | 6/2002 |
| DE | 202006017614 U1 | 4/2008 |
| DE | 102010034235 A1 | 2/2012 |
| WO | 02076570 A1 | 10/2002 |
| WO | 2012092493 A2 | 7/2012 |

\* cited by examiner

FILTER ELEMENT AND FILTER SYSTEM HAVING A FILTER ELEMENT

TECHNICAL FIELD

The invention relates to a filter element for filtering a fluid and a filter system including said filter element, in particular a fuel filter of a motor vehicle.

BACKGROUND OF THE INVENTION

A filter arrangement of the above-mentioned type is known from DE19519352A1, in which a hollow cylindrical filter insert is arranged in a cylindrical filter housing. The liquid to be filtered, for example fuel for an internal combustion engine, is guided in the radially outer chamber of the filter assembly, so that it can penetrate the filter insert from the outside into the inner cavity. The outlet for the filtered liquid is connected to the inner cavity.

At the beginning of a liquid feed into the outer chamber of the filter arrangement, a certain amount of air upstream from the liquid is transported into the outer chamber. This amount of air is likewise pressed by the subsequent pressure of the liquid through the filter insert and thus also reaches the outlet of the filter arrangement. This is very disadvantageous, in particular in use as a fuel or oil filter, because the downstream units, such as the internal combustion engine, can be hindered during operation by air pockets in the fuel supply.

A venting arrangement is therefore provided in DE19519352A1, which consists of a simple bore in a cap which is sealingly applied on the filter element, wherein the bore is connected with an outlet channel for the escaping air. This venting arrangement permits the escape of air contained in the filter arrangement, but also allows the inflow of air when no fuel is pumped into the internal combustion engine. Especially in internal combustion engines with start/stop systems, the internal combustion engine is often shut down and thus does not pump fuel, with the result that air may enter the fuel management system in the stop phase.

The object of the invention is to design a filter element such that the ingress of air into the fuel management system is prevented in a stationary internal combustion engine.

A further object of the invention is to provide a filter system for receiving such a replaceable filter element, which can prevent the entry of air into the fuel management system in a stationary internal combustion engine.

The aforementioned objects are achieved according to one aspect of the invention in that, in a filter element for a filter system, in particular for a fuel filter, with a first fluid path for filtering a first fluid, in particular for filtering fuel, and a second fluid path with a fluid line for carrying a second fluid, in particular for ventilating the filter system, a non-return valve is arranged in the second fluid path, which non-return valve closes if a flow of the first fluid through the filter element is interrupted. The filter element is replaceably arranged in the housing of the filter system and has a filter media body through which the first fluid path leads.

Advantageous embodiments and advantages of the invention result from the additional claims, the description and the drawings.

SUMMARY

A filter element for a filter system, in particular for a fuel filter, with a first fluid path for filtering a first fluid, in particular for filtering fuel, and a second fluid path with a fluid line for carrying a second fluid, in particular for ventilating the filter system, wherein a non-return valve is arranged in the second fluid path, said non-return valve closing. The filter element is replaceably arranged in the housing of the filter system and has a filter media body through which the first fluid path leads.

The non-return valve preferably closes the second fluid path when a predetermined system lower pressure limit is not met. In particular when the predetermined system lower pressure limit is not met on the raw side of the filter, which occurs in particular when an internal combustion engine is switched off, whereby a flow of the first fluid through the filter element is interrupted.

Advantageously, most existing continuous ventilations of a filter element of an internal combustion engine may thus be equipped with a non-return valve. In this way, fuel is retained in an internal combustion engine which is turned off, for example in start/stop operation, and it can be prevented that any air which is possible in a tank return line enters the fuel management system of the internal combustion engine via the filter system. When the internal combustion engine is not running, the ventilation of the filter element may remain closed. If the internal combustion engine is started, and in start/stop operation a very short engine start time is typically desirable, the necessary system pressure in the fuel management system for an ignition release can be built up immediately in the fuel system. The system pressure which builds up in an outer region of the filter element enables an opening of the non-return valve and the filter element can once again be continuously ventilated. The great advantage is thus that short motor start times are made possible, in that the fuel remains in the filter system.

In the case of a particularly preferred embodiment, the filter element comprises the fluid line of the second fluid path. The fluid line is replaceable with the filter element. In particular, it is undetachably connected to the (rest of) the filter element. The element-side fluid line can therefore also be configured so as to be fixed to the element. The fluid line is preferably an integral component of the filter element. In particular, a non-destructive separation of the fluid line from the (rest of) the filter element cannot occur.

The element-side fluid line may preferably be formed as a rigid tube, which contributes to the stability of the filter element.

In the installed state of the filter element, the element-side fluid line advantageously opens above the filter media body, so that, for example, fuel flows through the fluid line only when the filter media body is supplied completely with fuel, i.e. the air is displaced from the fuel filter so far that the fuel level extends above the filter media body.

A variant is particularly preferred in which the fluid line leads from one end face of the filter element, in particular the upper end face of an installed filter element, to the opposite (lower) end face. In this way, a discharge of the air from the filter may occur in a convenient manner via the housing bottom.

A particularly compact design is obtained in that the fluid line extends through an inner region surrounded by the filter media body. For example, the filter media body has a filter media web, preferably a star-pleated filter media web, for particle filtration. A coalescer medium, for example wound, is preferably provided within the filter media web. A water separating element, for example with a hydrophobic mesh fabric, follows the coalescer medium in the direction of flow, which water separating element is arranged for example within the coalescer medium and at the height thereof. An annular water discharge gap is formed between the coalescer medium and the water separating element. The fluid line is guided through the inner region surrounded by the water separating element.

In a particularly preferred variant, the filter element is provided with a non-return valve port, by means of which the element-side fluid line can be connected to the non-return valve, during installation of the filter element in the housing of the filter system. This variant enables a particularly preferred embodiment, in which the non-return valve is arranged on the housing side. Thus, it need be not replaced when changing the filter element.

A particularly robust construction of a non-return valve port results, for example, through a design as a stub-shaped protrusion of the fluid line. A non-return valve port designed as a stub-shaped protrusion can also be easily arranged above the rest of the filter element, in particular above the filter media body. It preferably protrudes at one end face of the filter element, in particular the upper end face.

For the purpose of ease of assembly of the filter element, the non-return valve port is arranged coaxially to a longitudinal element axis. Thanks to this measure, the filter element can be installed in any rotational position about its longitudinal element axis.

In a particularly preferred embodiment, the non-return valve port is provided with a sealing element for sealing engagement with the non-return valve. Straight sealing elements are subject to considerable wear, so it is advantageous to provide the sealing element on the non-return valve port, which is regularly replaced along with the filter element.

Advantageous sealing behavior and installation forces arise in that the sealing element is preferably formed as a circumferential sealing element directed radially outward. An O-ring applied to the element-side connection stub has proven useful in practice.

The filter element may further comprise an outflow port, by means of which the element-side fluid line can be connected to a housing-side outflow channel during installation of the filter element in the housing of the filter system. The outflow port may preferably be designed such that it contributes to the holding and support of the filter element in the housing. The outflow channel may preferably be connected to a tank return.

A particularly robust construction results through a design of the outflow port as a stub-shaped protrusion of the fluid line.

Comparable to the conditions of the non-return valve port, the outflow port may also be provided with a sealing element for sealing engagement on the housing-side outflow channel, which is, in particular, a circumferential sealing element directed radially outward. An O-ring applied on the outflow-side connection stub can be regarded as a proven example.

For assembly reasons, a coaxial arrangement of the outflow port to a longitudinal element axis is advantageous.

In a particularly preferred embodiment, the filter element has two circumferential sealing elements in the region of that end face which is arranged below in the installed state of the filter element. For example, in a fuel filter with a clean-side water separation, these sealing elements may be used to seal a raw fluid-side annular space, which surrounds the filter element, from a clean fluid-side water collection area below the filter element. Two sealing elements are provided in order to control the outflow of fuel from the raw fluid-side annular space during removal of the filter element in order to avoid or at least reduce a contamination of the clean-side water collection area with raw fluid from the outer annular space. In particular, one of the sealing elements is used for sealing the raw fluid-side annular space against an emptying area. The other sealing element is used for sealing the emptying area against the clean-side water collection area. The emptying area may preferably be connected to a tank return.

In a particularly preferred variant, the two sealing elements are arranged in the region of that end face on which the outflow port of the element-side fluid line is also provided.

For the purpose of lower assembly forces and a compact construction, one of the sealing elements is oriented radially outward and/or one of the sealing elements is oriented radially inward. The two sealing elements are preferably of different diameters and/or are arranged coaxially to each other.

In a particularly preferred embodiment, the filter element has a clean fluid outlet in the region of that end face on which the outflow port is arranged. The various ports may thus be advantageously integrated into the housing container.

A further advantageous measure for avoiding the contamination of the clean side of the filter with unfiltered fluid is obtained in that the clean fluid outlet is provided with a stub-shaped protrusion, which preferably surrounds the outflow port.

In one embodiment, in which the filter element is designed as a fuel filter and has a water separation, a water outlet is preferably provided for water separated from the first fluid in the region of that end side on which the outflow port is arranged. A mixing of the separated water with the filtered fuel is thus avoided, in that the water outlet surrounds the stub-shaped protrusion which surrounds the clean fluid outlet.

Alternatively or in addition to a variant with a housing-side non-return valve, a non-return valve is fixed on the fluid line, which is preferably firmly attached to the element. A construction in which the non-return valve is integrated into the fluid line is particularly compact.

Another aspect of the invention relates to a filter system, in particular a fuel filter, with a first fluid path for filtering a first fluid, in particular for filtering fuel, and a second fluid path with a fluid line for carrying a second fluid, in particular for ventilating a filter system, wherein a non-return valve is arranged in the fluid line of the second fluid, which non-return valve closes if a flow of the first fluid through the filter element is interrupted, wherein the filter system is equipped with a filter element according to the variants described hereinabove and hereinbelow.

In the case of a particularly preferred embodiment of the filter system, the non-return valve is arranged above the filter media body of the filter element.

It is particularly advantageous if the non-return valve is fixed on a housing cover of the filter system. This may be releasably or permanently connected to the housing cover, for example snapped on.

The non-return valve preferably has a recess for an element-side non-return valve port.

Conveniently, the filter element may be provided at least on one side with a cover or an end plate, wherein the fluid line may be accessible through the cover and the non-return valve may be arranged above or in the cover. In this way, a simple installation and also possible interchangeability of the non-return valve is provided in case of failure.

A further advantageous design possibility is to form the filter element such that a non-return valve is alternatively or additionally arranged within the fluid line. The fluid line, which can often be realized in a support tube of the filter element, may thus be directly connected with the non-return valve, which can reduce the number of components and further simplify installation.

It may be generally advantageous that the non-return valve can be fixed with a snap connection and sealed with an O-ring seal. The non-return valve, which can be advantageously arranged in a valve support in this embodiment, can thus be easily inserted during assembly. For example, the cover of the filter element may be held in place by means of the snap connection and a housing cover of the filter system may likewise be held by means of the snap connection. In addition, the non-return valve can easily be exchanged by means of such an arrangement, which is sealed by means of an O-ring seal, in case of failure of the non-return valve.

Advantageously, the filter element may have a hollow cylindrical design, and the first fluid path may lead radially through a filter wall portion of the filter media body of the hollow cylindrical filter element. The first fluid path may advantageously lead radially from outside to inside into the filter element. This arrangement allows an inflow, for example of fuel, from the outside across the diameter of the filter element. The fuel may then flow through the filter element to the inside and may be led via the inner part of the filter element into the fuel supply of an internal combustion engine.

Advantageously, the second fluid path may likewise extend into the interior of the filter element, wherein a separate tube is provided for the airflow, which can be realized for example, in order to save components and reduce the complexity of the filter element, in a central support tube of the filter element.

As mentioned above, the first fluid path may advantageously be used for filtering fuel. The use of such a configuration is also conceivable for the use of oil filters. Of course, filter systems for other liquid fluids which must be filtered are typically provided with ventilation systems, so that the use of such a non-return valve is also conceivable in the filtering of other fluids.

As also mentioned above, the second fluid path may be used for ventilating a fuel management system of an internal combustion engine. Especially in internal combustion engines, in which the starting process should take place in a relatively short time, as is the case in modern internal combustion engines in start/stop operation, such a ventilation system is of great advantage, as it retains the fluid in the filter system when the internal combustion engine is turned off and thus enables short start times.

A further advantageous embodiment may provide an arrangement of the fluid line in a support tube for receiving the filter element.

BRIEF DESCRIPTION OF THE DRAWINGS

Further advantages appear from the following description of drawings. The drawings illustrate exemplary embodiments of the invention. The drawings, description and claims contain numerous features in combination. A person skilled in the art will expediently also consider the features individually and combine them into appropriate further combinations.

DETAILED DESCRIPTION

In the figures, identical or similar components are provided with the same reference characters. The figures are only exemplary and are not meant to be limiting.

The invention is illustrated with reference to a fuel filter, however it may also be provided for other filter systems with corresponding adaptation of the construction.

Figure 1:
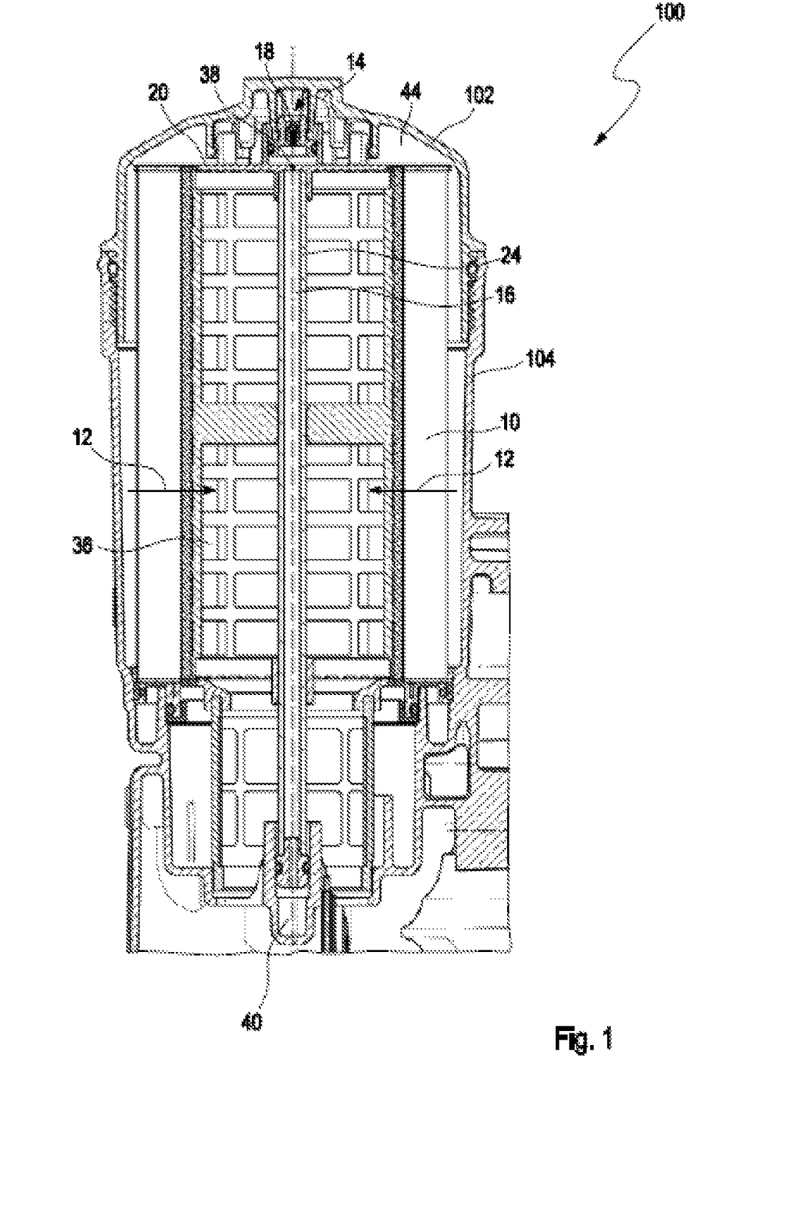
FIG. 1 shows a longitudinal section through a filter system according to one embodiment for fuel filtration in a motor vehicle.

FIG. 1 shows a longitudinal section through a filter system 100 according to one embodiment of the invention for fuel filtration in a motor vehicle. The filter system 100 comprises a central housing in two parts, an upper part 102 and a lower part 104. A hollow cylindrical filter element 10 sits centrally arranged in the housing, through which correspondingly flows a first fluid, in particular fuel, radially from outside to inside by means of the first fluid path 12, marked by an arrow, said fluid thereby being filtered. The filtering takes place here in the filter wall portion of a filter media body of the hollow cylindrical filter element 10. The filter media body has, for example, by means of a star-folded filter media web, which is used for particle filtration. Within the star-folded filter media web is provided, for example, a wound coalescer medium. A water separating element, for example with a hydrophobic mesh fabric, which is arranged below the star-folded filter media web and the coalescer medium, follows the coalescer medium in the direction of flow.

In an embodiment not shown, a reverse direction of flow from inside to outside is also conceivable with a corresponding adjustment of the positions of the respective components.

The filter element 10 replaceably designed. The filter system 100 can be opened for replacement, for example, via the two-part housing 102, 104. The filtered fluid flows downward via the inner region 36 of the filter element 10 and is conveyed further, for example to the injection system of an internal combustion engine. An end plate or cover 20 is mounted on the upper end of the filter element 10, said cover being flatly and sealingly applied on the filter element 10 and to which cover is adjoined a fluid line 16 in the inner region 36 of the filter element. The fluid line 16 is advantageously designed simultaneously as a part of a support tube 24 of the filter system 100, in order to represent a constructed receptacle for the filter element 10. A non-return valve 18 is centrally arranged in the cover 20. A second fluid path 14, which may serve for ventilating the filter system 100, thus leads via the outer region 44 of the filter element 10 into the non-return valve 18 and through a bore 38 in the cover 20, which serves as a throttle bore for setting a defined flow resistance and which is preferably designed with a size of 0.5 mm, into the fluid line 16. Air which has been entrained with the fuel from a tank system may thus be led back out of the filter system 100 by means of the non-return valve 18 and the fluid line 16 via an outlet 40. If an internal combustion engine connected to the filter system 100 is turned off, for example in start/stop operation, and as a result no fuel is resupplied from the corresponding tank system, the non-return valve 18 may thus close. The pressure in the filter element 10 is thereby maintained, and the fuel remains in the filter system 100. This provides the conditions for a rapid start of the internal combustion engine. After the re-opening of the non-return valve 18, the ventilation of the filter system 100 again begin to operate.

Figure 2:
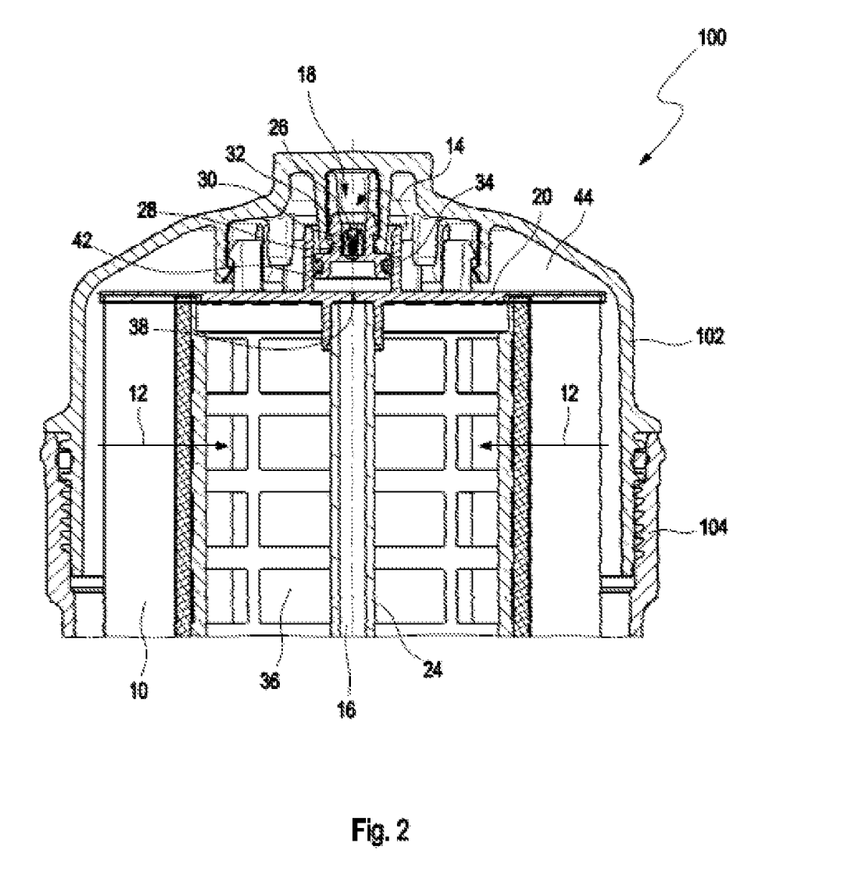
FIG. 2 shows an enlarged view of the upper part of the longitudinal section of FIG. 1 with details of the arrangement of a non-return valve in a cover of a filter element.

FIG. 2 shows an enlarged view of the upper part of the longitudinal section of FIG. 1 with details of the arrangement of the non-return valve 18 in the cover 20 of the filter element 10. The non-return valve 18 itself is embedded with its valve body 30 in a valve support 32, for example pressed thereinto. The valve support 32, in turn, is inserted by means of an O-ring seal 34 in a corresponding receptacle 42 of the cover 20 and thus establishes a sealed connection to the cover 20. The cover 20, in turn, sits sealingly on the filter element 10 and has a connection via the bore 38 to the support tube 24 designed as the fluid line 16. In cross-section, the valve body 30 displays the usual design of a non-return valve with a ball 26, which is pressed into a valve seat by means of a spring 28. The second fluid path 14 for ventilating the filter system 100 thus leads via the outer region 44 of the filter element 10 through the non-return valve 18 via the bore 38 into the fluid line 16 of the support tube 24.

Figure 3:
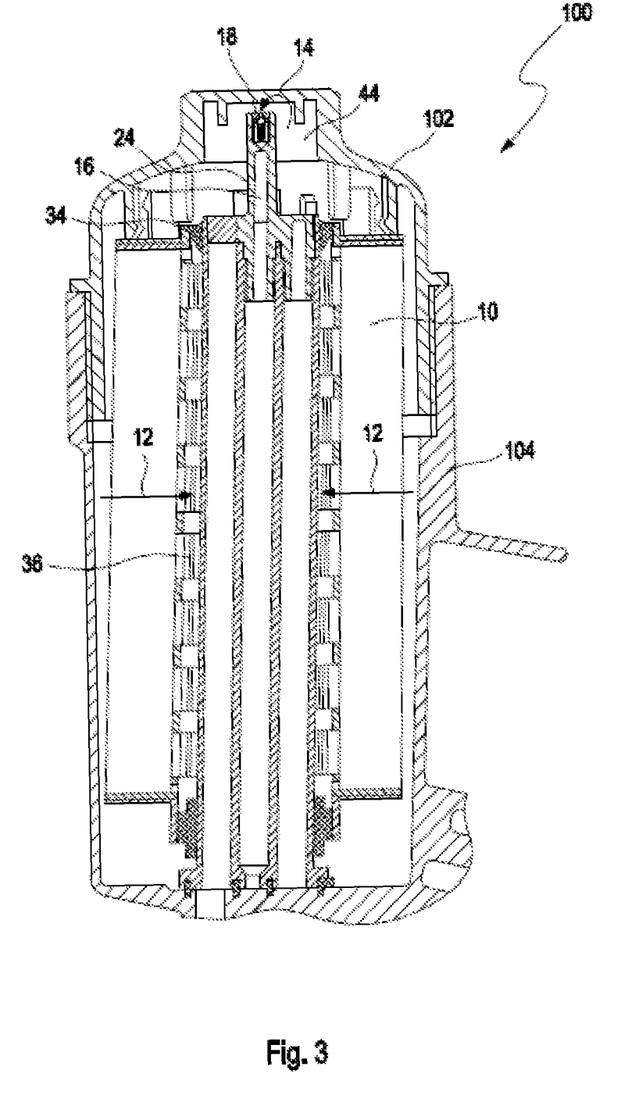
FIG. 3 shows a longitudinal section through a filter system according to another embodiment for fuel filtration in a motor vehicle with a direct arrangement of a non-return valve in a fluid line.

FIG. 3 shows a longitudinal section through a filter system 100 according to another embodiment of the invention for fuel filtration in a motor vehicle with a direct arrangement of a non-return valve 18 in a fluid line 16. The construction of the filter system 100 is similar to the filter system shown in FIG. 1 with a flow direction from the outside to the inside, which is indicated by the radial arrows from the outside to the inside through the filter element 10.

A hollow cylindrical filter element 10 is arranged in a two-part housing 102, 104, wherein the filter element 10 can be designed to be replaceable. The filter system 100 can be opened for replacement, for example, via the two-part housing 102, 104. A first fluid path 12 shows the route of the first fluid to be filtered, for example fuel, from an outer region 44 of the filter element 10 radially through the periphery into an inner region 36. In contrast to the filter system shown in FIG. 1, however, the non-return valve 18 here is arranged directly in the fluid line, which in turn is formed as a support tube 24. The filter element 10 is fitted over the support tube 24 and completes a radial seal with the support tube 24 by means of a sealing element 34. The second fluid path 14 for ventilating the filter system 100 leads in a manner analogous to FIG. 1 from the outer region 44 of the filter element 10 through the non-return valve 18 into the fluid line 16, which likewise opens into an outlet (not shown).

Figure 4:
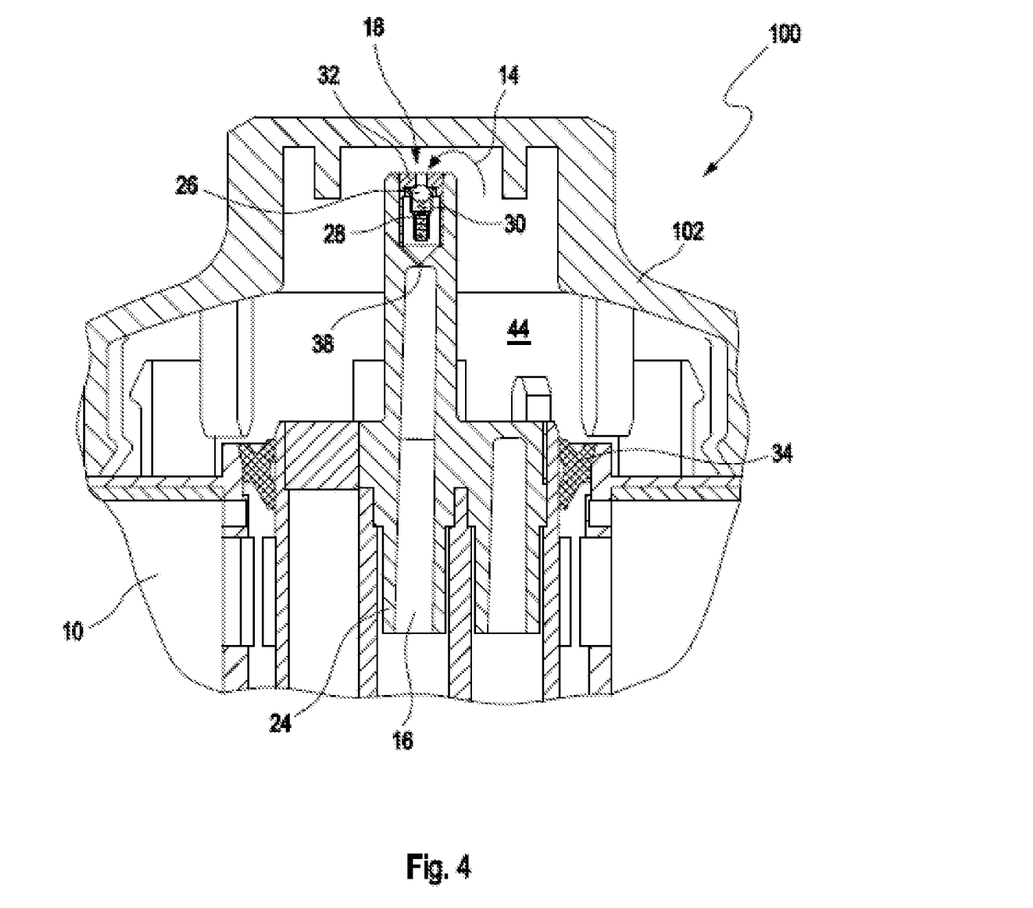
FIG. 4 shows an enlarged view of the upper part of the longitudinal section of FIG. 3 with details of the arrangement of a non-return valve in a fluid line.

FIG. 4 shows an enlarged view of the upper part of the longitudinal section of FIG. 3 with details of the arrangement of the non-return valve 18 in the fluid line 16. The non-return valve 18 is embedded with its valve body 30 directly in the fluid line 16, for example pressed thereinto, said fluid line being formed as a support tube 24 and being radially sealed with a sealing element 34 with respect to the filter element 10. The second fluid path 14 for ventilating filter system 100 thus leads in an analogous manner to the filter system shown in FIG. 1 from the outer region of the filter element 10 via the non-return valve 18, the function of which is represented by a ball 26 which is pressed into a valve seat by means of a spring 28, via a bore 38, which serves as a throttle bore for setting a defined flow resistance and which is preferably designed with a typical size of approximately 0.5 mm, into the support tube 24 which is formed as a fluid line, from where the air can be redirected back into the tank system. The manner of operation of the non-return valve 18 occurs in an analogous manner to the filter system shown in FIG. 1. If an internal combustion engine connected to the filter system 100 is turned off, for example in start/stop operation, and as a result no fuel is resupplied from a tank system, the non-return valve 18 may thus close. The pressure in the filter element 10 is thereby maintained, the fuel remains in the filter system 100. This provides the conditions for a quick start of the internal combustion engine. After re-opening of the non-return valve 18, the ventilation of the filter system 100 again begin to operate.

Figure 5:
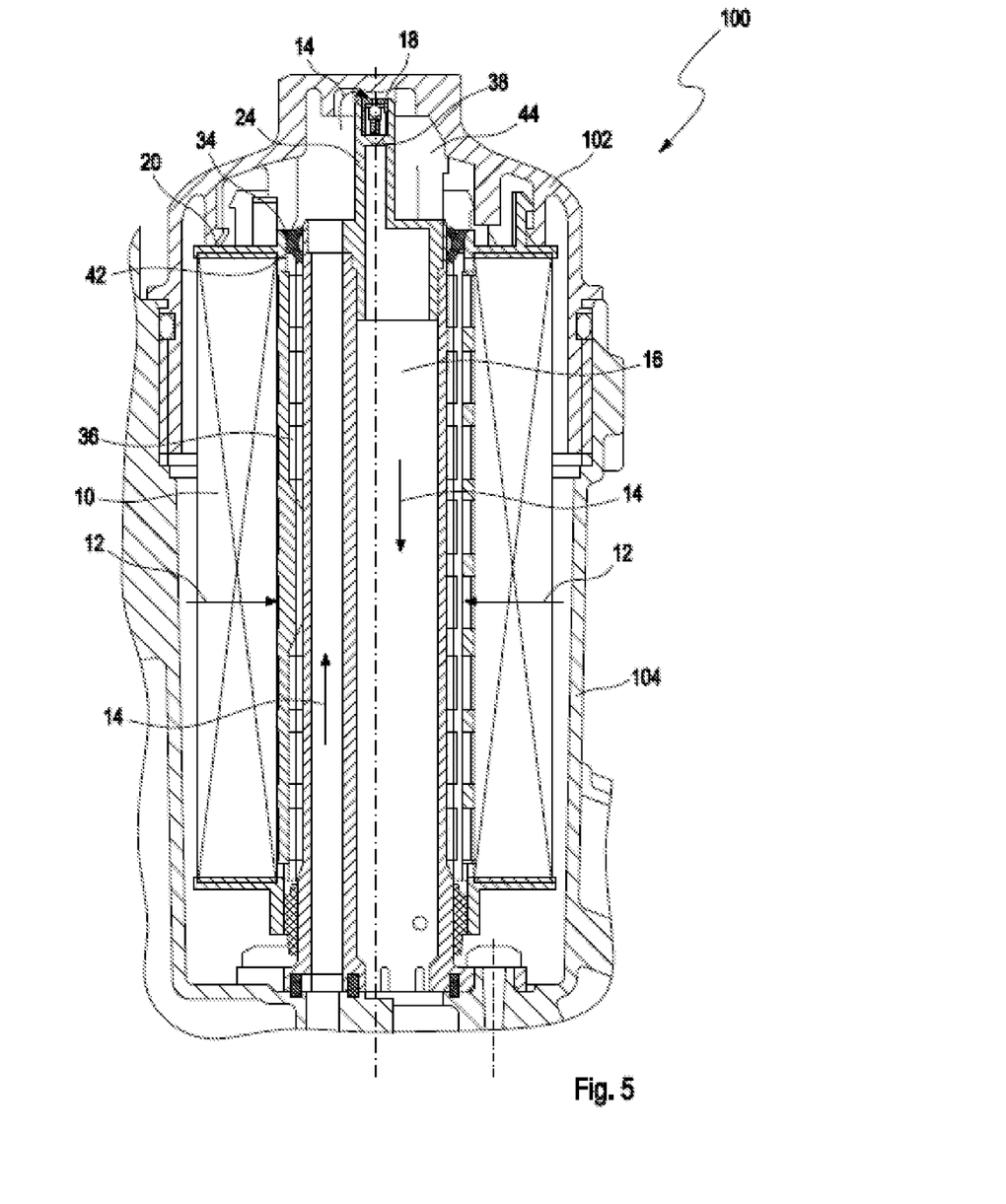
FIG. 5 shows a longitudinal section through a filter system according to a further embodiment for fuel filtration in a motor vehicle with a direct arrangement of a non-return valve in a fluid line.

FIG. 5 shows a longitudinal section through a filter system 100 according to a further embodiment of the invention for fuel filtration in a motor vehicle with a direct arrangement of a non-return valve 18 in a fluid line 16. The construction of the filter system 100 is similar to the filter system shown in FIG. 3 with a flow direction from outside to inside, which is indicated by arrows from outside to inside into the filter element 10, and differs from the embodiment shown in FIG. 3 by a support tube 24 which is differently formed in the upper part, which has a fluid line 16 with a significantly larger diameter than the fluid line 16 shown in FIG. 3, and thus a better ventilating behavior. The other functional behavior of the filter system 100 according to the embodiment shown in FIG. 5 corresponds to the embodiment shown in FIG. 3.

A hollow cylindrical filter element 10 is arranged in a two-part housing 102, 104, wherein the filter element 10 can be designed to be replaceable. The filter system 100 can be opened for replacement, for example, via the two-part housing 102, 104. A first fluid path 12 shows the route of the first fluid to be filtered, for example fuel, from an outer region 44 of the filter element 10 radially through the periphery into an inner region 36. As in the filter system shown in FIG. 3, the non-return valve 18 here is arranged directly in the fluid line, which is formed as a two-piece support tube 24. The non-return valve 18 is seated in the upper part of the support tube 24. The filter element 10 is fitted over the support tube 24 and completes a radial seal with the support tube 24 by means of a sealing element 34. The second fluid path 14 for ventilating the filter system 100 leads in a manner analogous to FIG. 3 from the outer region 44 of the filter element 10 through the non-return valve 18 into the fluid line 16, which opens into an outlet 40.

Figure 6:
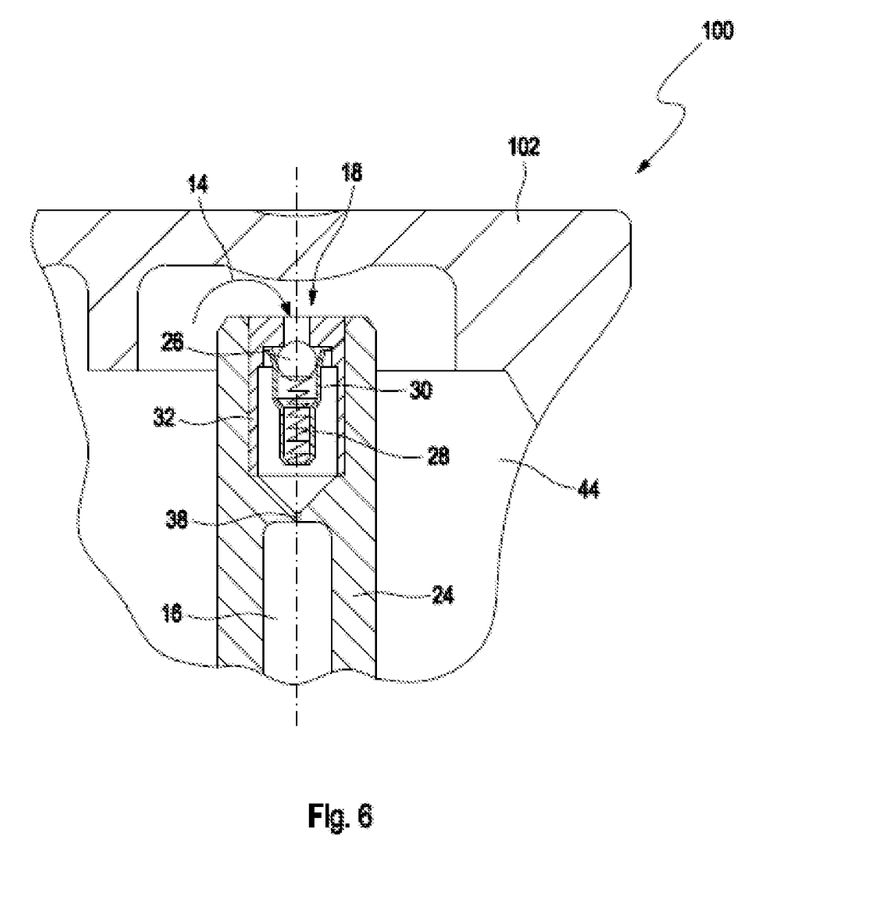
FIG. 6 shows an enlarged view of the upper part of the longitudinal section of FIG. 5 with details of the arrangement of a non-return valve in a fluid line.

FIG. 6 shows an enlarged view of the upper part of the longitudinal section of FIG. 5 with details of the arrangement of the non-return valve 18 in the fluid line 16. The non-return valve 18 is embedded with its valve body 30 directly in the fluid line 16, for example pressed thereinto, said fluid line being formed as the upper part of the support tube 24 and being radially sealed with a sealing element 34 with respect to the filter element 10. The second fluid path 14 for ventilating the filter system 100 thus leads in an analogous manner to the filter system shown in FIG. 3 from the outer region of the filter element 10 via the non-return valve 18, the function of which is represented by a ball 26 which is pressed into a valve seat by means of a spring 28, via a bore 38, which serves as a throttle bore for setting a defined flow resistance and which is preferably designed with a typical size of approximately 0.5 mm, into the support tube 24 which is formed as a fluid line 16, from where the air can be redirected back into the tank system. The manner of operation of the non-return valve 18 occurs in an analogous manner to the filter system shown in FIG. 3. If an internal combustion engine connected to the filter system 100 is turned off, for example in start/stop operation, and as a result no fuel is resupplied from a tank system, the non-return valve 18 may thus close. The pressure in the filter element 10 is thereby maintained, the fuel remains in the filter system 100. This provides the conditions for a quick start of the internal combustion engine. After re-opening of the non-return valve 18, the ventilation of the filter system 100 again begin to operate.

Figure 7:
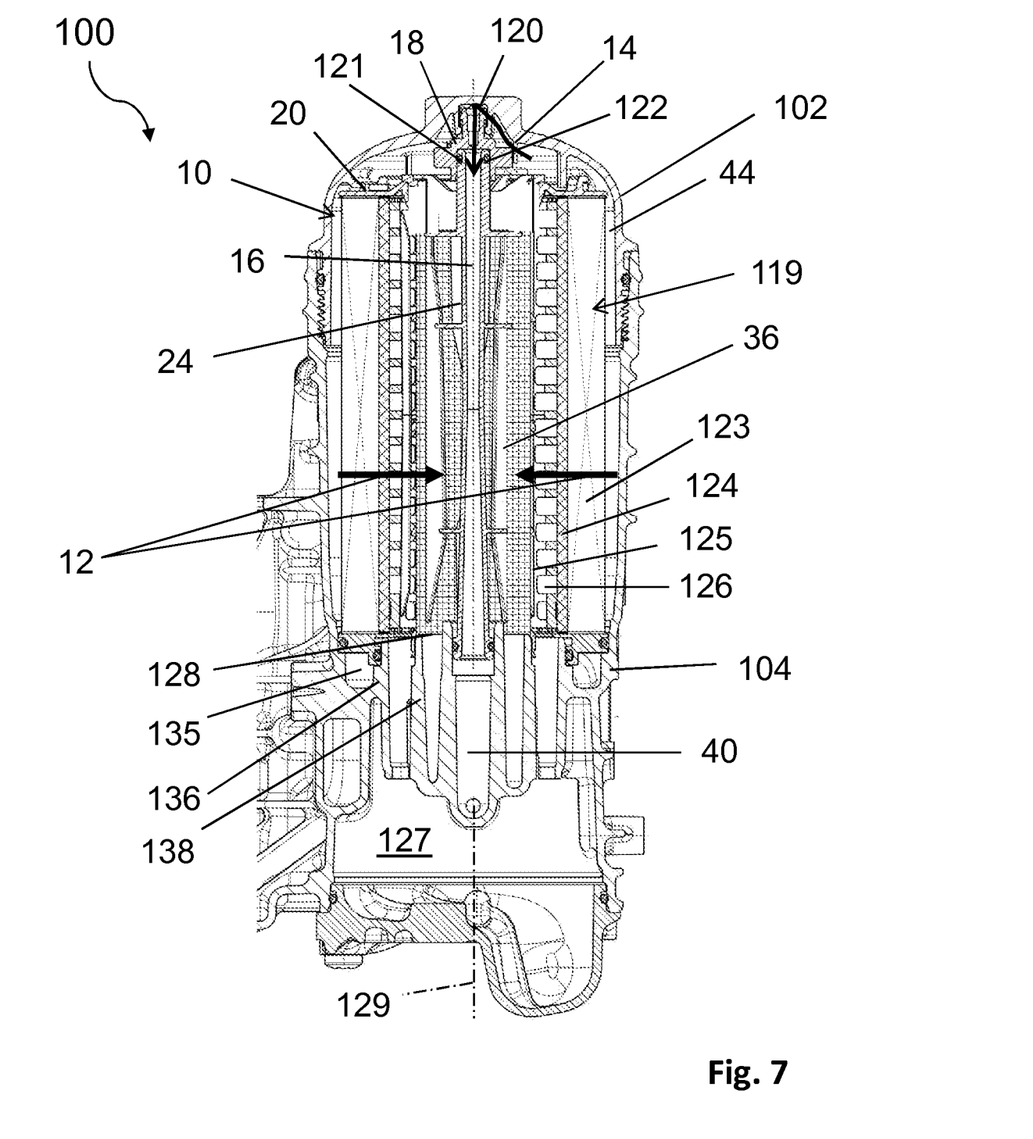
FIG. 7 shows a longitudinal section through a filter system according to a further embodiment for fuel filtration in a motor vehicle with an arrangement of a non-return valve on a housing cover.

FIG. 7 shows a longitudinal section through a filter system 100 according to a further embodiment for fuel filtration in a motor vehicle with an arrangement of a non-return valve 18 on a housing cover 102. A replaceable filter element 10 is arranged in the housing 102, 104 of the filter system 100. A first fluid path 12 shows the route of the first fluid to be filtered, for example fuel, from an outer region 44 of the filter element 10 radially through a filter media body 119 of the filter element 10 into an inner region 36. The non-return valve 18 is arranged above the filter media body 119 of the filter element 10 and is fixed on the housing cover 102 by means of a snap connection 120. The non-return valve 18 has a receptacle 121 for an element-side non-return valve port 122. The second fluid path 14 for ventilating the filter system 100 leads from the outer region 44 of the filter element 10 through the non-return valve 18 into the fluid line 16 fixed to the element, which opens into an outlet 40 in the form of a housing-side outflow channel. In general, the manner of function of the non-return valve 18 corresponds to that of the already-described embodiments.

The fluid line 16 is part of the replaceable filter element 10. It extends from the end face of the filter element 10, which is arranged above in the installed state, to the opposite, lower end face through the inner region 36 surrounded by the filter media body 119.

Similarly to the embodiment according to FIGS. 1 and 2, the filter media body 119 has a star-folded filter media web 123, which is used for particle filtration. A wound coalescer medium 124 is likewise provided within the star-folded filter media web 123. A water separating element 125, for example with a hydrophobic mesh fabric, in turn follows the coalescer medium 124 in the direction of flow, which water separating element is however arranged for example within the coalescer medium 124 and at the height thereof. An annular water discharge gap 126 is formed between the coalescer medium 124 and the water separating element 125. The annular water discharge gap 126 is connected below with a water collection area 127 of the filter system 100. The inner region 36 surrounded by the water separating element 125 is provided on the lower end face with a clean fuel outlet 128.

Figure 8:
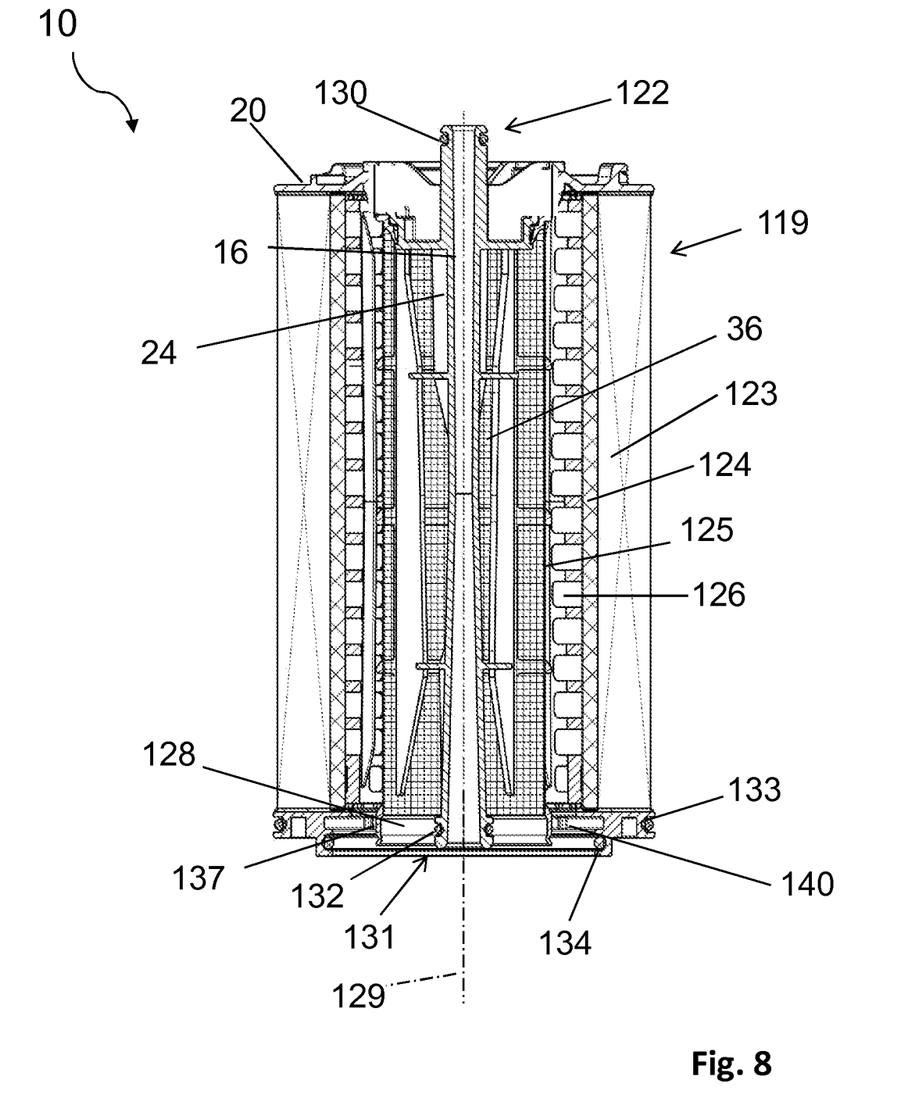
FIG. 8 shows a longitudinal section through the filter element of the filter system according to FIG. 7.

In FIG. 8, the filter element 10 of the filter system 100 according to FIG. 7 is shown in isolation. The non-return valve port 122 is formed as a stub-shaped protrusion of the fluid line 16, which protrudes on the upper end face of the filter element 10 and is arranged coaxially to the longitudinal element axis 129. It is provided with a sealing element oriented radially outward in the form of an applied O-ring 130 for sealing against the non-return valve 18.

The filter element 10 comprises an outflow port 131 on the lower end face, by means of which the fluid line 16 can be connected to the discharge 40 during installation of the filter element 10 in the housing 102, 104 of the filter system 100. The outflow port 131 is also designed as a stub-shaped protrusion of the fluid line 16, which is arranged coaxially to the longitudinal element axis 129. It has a circumferential sealing element which is oriented radially outward in the form of an applied O-ring 132.

In addition, the filter element 10 has two circumferential sealing elements 133, 134 on the lower end face, wherein the sealing element 133 is oriented radially outward and the sealing element 134 is oriented radially inward. The sealing element 133 abuts against the inner housing wall and is used for sealing the outer annular space 44 from an emptying area 135 formed as a groove (FIG. 7). The other sealing element 134 abuts against a housing stub 136 and is used for sealing the water collection area 127 against the emptying area 135. The element-side clean fuel outlet 128 is surrounded by a stub-shaped protrusion 137, which additionally surrounds the outflow pot 131 and is mounted on a housing-side stub 138, which encloses an annular channel of the fuel outlet 108.

Figure 9:
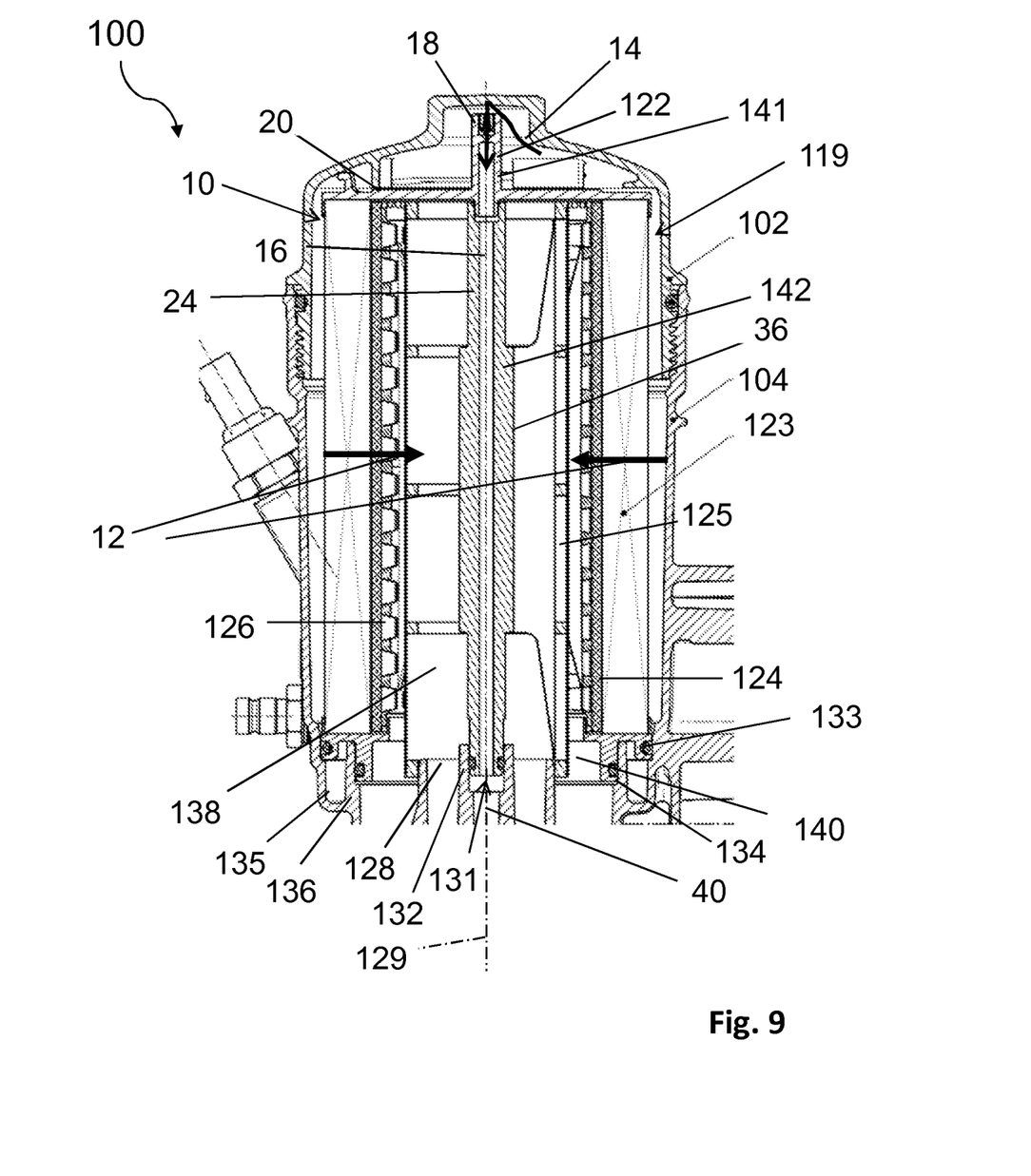
FIG. 9 shows a longitudinal section through a filter system according to a further embodiment for fuel filtration in a motor vehicle with an arrangement of a non-return valve in the fluid line fixed to the element.

FIG. 9 shows a longitudinal section through a filter system 100 according to a further embodiment of the invention for fuel filtration in a motor vehicle with an arrangement of a non-return valve 18 in the fluid line 16 fixed to the element. The fluid line 16 is formed in this example from a section 141 provided through the cover 20 of the filter element 10 and a section 142 extending in the inner region of the filter media body 119. As in the example according to FIG. 7, the fluid line 16 is exchanged together with the filter element 10, wherein at the same time the non-return valve 18 integrated in section 141 is also exchanged. The filter system 100 according to FIG. 9 is similar to the other embodiments in construction and function, so that reference is made in general to the preceding descriptions, wherein advantageous differences also arise from FIG. 9.

What is claimed is:

1. A filter element (10) for a fuel filter (100), including:
    a hollow filter media body of a filter media, circumferentially surrounding a longitudinal element axis, the hollow filter media body having an open interior and includes:
        an inflow face at a radial outer surface of the hollow filter media body of the filter element, receiving a first fluid to be filtered;
        an outflow face at a radial inner surface of the hollow filter media body such that filter media of the hollow filter media body is arranged between the inflow face and the outflow face, the outflow face discharging filtered fluid, the outflow face radially surrounding the open interior of the hollow filter media body of filter media;
    wherein axial, as used herein, is a direction of the longitudinal element axis;
    wherein radial, as used herein, is a direction transverse to the longitudinal element axis;
    a first end plate (20) arranged directly on a first axial end face of the filter media of the hollow filter media body of the filter element;
    a second end plate on an opposite second axial end face of the filter media of the hollow filter media body of the filter element;

a first fluid path (12) for filtering the first fluid, the first fluid path entering the inflow face, continuing through the filter media and exiting at the outflow face at the open interior of the hollow filter media body;

an air outflow pipe (16) arranged in the open interior of the hollow filter media body for carrying air for ventilating a filter; system, the air outflow pipe having a first axial end connected to the first end plate (20) in the open interior of the hollow filter media body, the air outflow pipe extending axially through the open interior of the hollow filter media body to and connected to the second end plate of the hollow filter media body of filter media;

a non-return valve (18) arranged at the first axial end of the air outflow pipe and positioned outside of the open interior of the hollow filter media body such that the first end plate is arranged axially between the non-return valve and the open interior of the hollow filter media body, the non-return valve (18) and the air outflow pipe forming a portion of a second fluid path (14);

wherein the second fluid path carrying air is carried through the air outflow pipe from the second end plate, through the open interior of the hollow filter media body, through the first end plate and then through the non-return valve;

wherein the non-return valve (18) closes the air outflow pipe when a predetermined system lower pressure limit is not met and/or a flow of the first fluid through the filter element (10) is interrupted;

wherein the filter element (10) is replaceably arrangeable in a housing of the filter system (100);

wherein the air outflow pipe (16) extends completely through the open interior of the hollow filter media body (119).

2. The filter element (10) according to claim 1, wherein the air outflow pipe (16) has a non-return valve port (122) configured for connecting to the non-return valve during installation of the filter element into the housing of the filter system;

wherein the air outflow pipe (16) extends from the open interior of the hollow filter media body, continuing through the first end plate (20) and projecting outwardly away from the first end plate to the non-return valve port of the air outflow pipe.

3. The filter element (10) according to claim 2, wherein the non-return valve port (122) is a stub-shaped protrusion of the air outflow fluid line (16), which protrudes axially outwardly beyond the first axial end face of the filter element (10) and/or is arranged coaxially to a longitudinal element axis (129).

4. The filter element (10) according to claim 3, wherein the non-return valve port (122) has a sealing element (130) for sealing engagement with the non-return valve (18);

wherein the sealing element is a circumferential sealing element (130) which is oriented radially outward.

5. The filter element (10) according to claim 1, wherein the filter element (10) has an outflow port (131) on an opposite second axial end of the air outflow pipe by means of which the air outflow fluid line (16) can be connected to a housing-side outflow channel (40) during installation of the filter element (10) in the housing (102, 104) of the filter system (100).

6. The filter element (10) according to claim 5, wherein the outflow port (131) is a stub-shaped protrusion of the air outflow pipe (16), which is arranged coaxially to a longitudinal element axis (129).

7. The filter element (10) according to claim 6, wherein the outflow port (131) has a sealing element (132) for sealing engagement with the housing-side outflow channel (40);

wherein the sealing element is a circumferential sealing element (131) which is oriented radially outward.

8. The filter element according to claim 1, wherein the second end plate of the filter element (10) has two circumferential sealing elements (133, 134) arranged below the second axial end face of the filter media;

wherein one of the sealing elements (133) or both are oriented radially outward and/or one of the sealing elements (134) or both are oriented radially inward.

9. The filter element (10) according to claim 6, wherein the filter element (10) has an annular clean fluid outlet (128) arranged in the second end plate at the second axial end face of the filter media, wherein the annular clean fluid outlet radially surrounds the outflow port (131) of the air outflow pipe (16);

wherein the annular clean fluid outlet (128) is provided with a stub-shaped protrusion (137) radially surrounding the outflow port (131) of the of the air outflow pipe.

10. The filter element (10) according to claim 9, wherein the second end plate has a water outlet opening (140) for water separated from a first fluid in the region, the water outlet opening (140) radially surrounding the stub-shaped protrusion (137) which radially surrounds the clean fluid outlet (128).

11. The filter element (10) according to claim 1, wherein the non-return valve (18) is fixed on the air outflow pipe (16) and integrated into the air outflow pipe (16).

12. A filter system (100), including:

a fuel filter (100);

a filter element (10) arranged in the fuel filter, wherein the filter element includes:

a hollow filter media body of a filter media, circumferentially surrounding a longitudinal element axis, the hollow filter media body having an open interior and includes:

an inflow face at a radial outer surface of the hollow filter media body of the filter element, receiving a first fluid to be filtered;

an outflow face at a radial inner surface of the hollow filter media body such that filter media of the hollow filter media body is arranged between the inflow face and the outflow face, the outflow face discharging filtered fluid, the outflow face radially surrounding the open interior of the hollow filter media body of filter media;

wherein axial, as used herein, is a direction of the longitudinal element axis;

wherein radial, as used herein, is a direction transverse to the longitudinal element axis;

a first end plate (20) arranged directly on a first axial end face of the filter media of the hollow filter media body of the filter element;

a second end plate on an opposite second axial end face of the filter media of the hollow filter media body of the filter element;

a first fluid path (12) for filtering the first fluid, the first fluid path entering the inflow face, continuing through the filter media and exiting at the outflow face at the open interior of the hollow filter media body;

an air outflow pipe (16) arranged in the open interior of the hollow filter media body for carrying air for ventilating the filter system, the air outflow pipe having a first axial end connected to the first end plate (20) in the open interior of the hollow filter media body, the air outflow pipe extending axially through the open interior of the hollow filter media body to and connected to the second end plate of the hollow filter media body of filter media;

a non-return valve (18) arranged at the first axial end of the air outflow pipe and positioned outside of the open interior of the hollow filter media body such that the first end plate is arranged axially between the non-return valve and the open interior of the hollow filter media body, the non-return valve (18) and the air outflow pipe forming a portion of a second fluid path (14);

wherein the second fluid path carrying air is carried through the air outflow pipe from the second end plate, through the open interior of the hollow filter media body, through the first end plate and then through the non-return valve;

wherein the non-return valve (18) closes the air outflow pipe when a predetermined system lower pressure limit is not met and/or a flow of the first fluid through the filter element (10) is interrupted;

wherein the filter element (10) is replaceably arrangeable in a housing of the filter system (100);

wherein the air outflow fluid line (16) extends from the first axial end face of the filter element (10) to the opposite second axial end face of the hollow filter media body of the filter element (10);

wherein the air outflow pipe (16) extends completely through the open interior of the hollow filter media body (119).

13. The filter system (100) according to claim 12, wherein the non-return valve (18) is arranged above the hollow filter media body (119) of the filter element (10).

14. The filter system (100) according to claim 12, wherein the non-return valve (18) is fixed on a housing cover (102) of the filter system (100), and has a receptacle (121) for an element-side non-return valve port (122).

* * * * *